Figure 1:
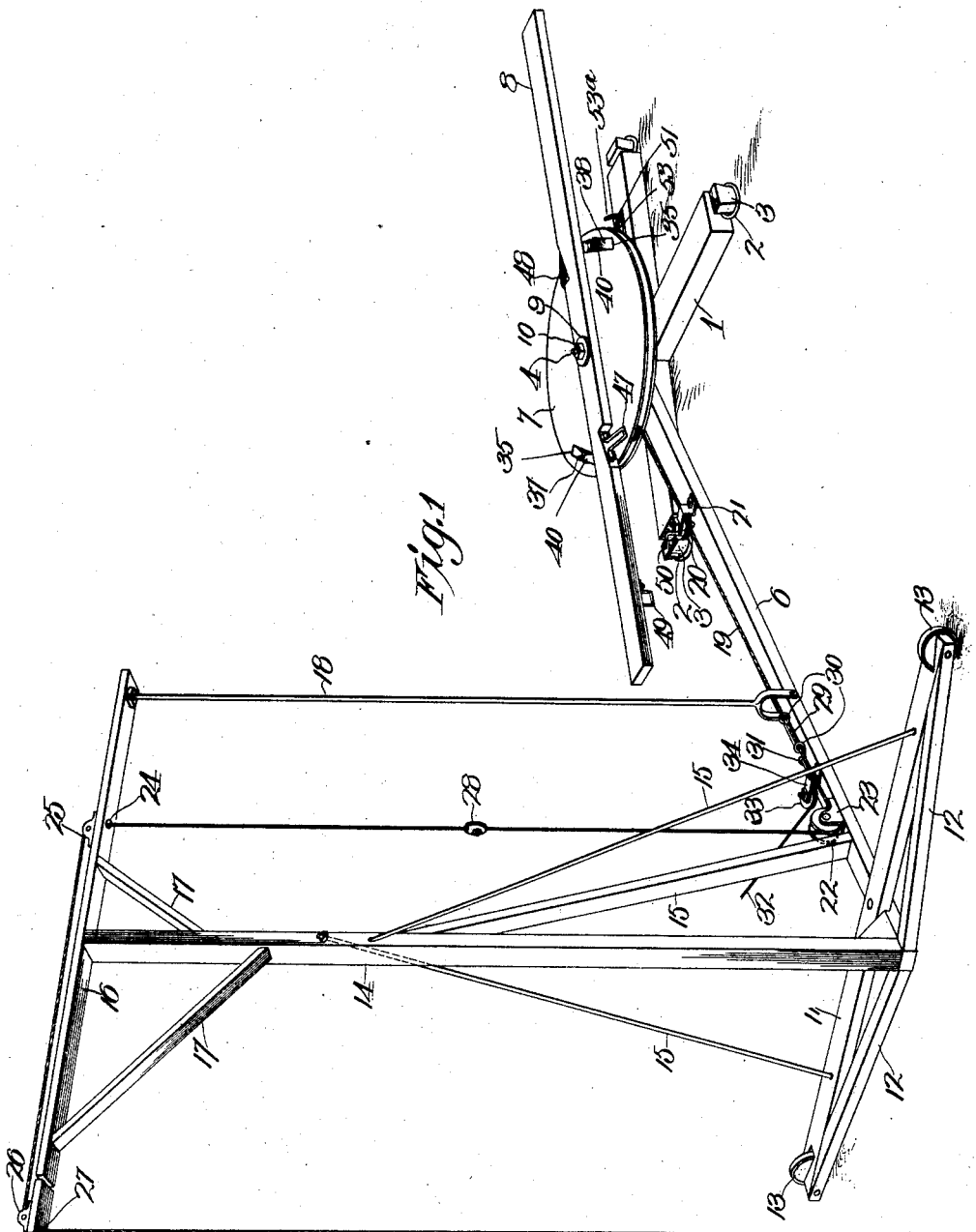

E. A. RHOADS.
HAY STACKER.
APPLICATION FILED JAN. 10, 1908.

905,368.

Patented Dec. 1, 1908.
3 SHEETS—SHEET 1.

Witnesses
Frank R. Glore
H. C. Rodgers

Inventor
E. A. Rhoads
By George H. Thorpe Atty

E. A. RHOADS.
HAY STACKER.
APPLICATION FILED JAN. 10, 1908.
905,368.
Patented Dec. 1, 1908.
3 SHEETS—SHEET 2.
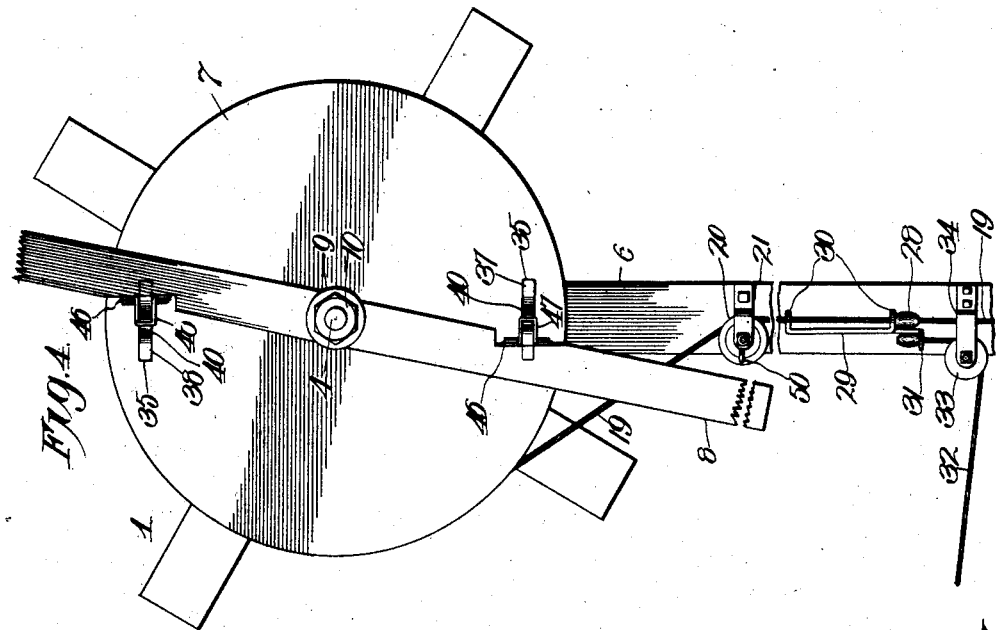
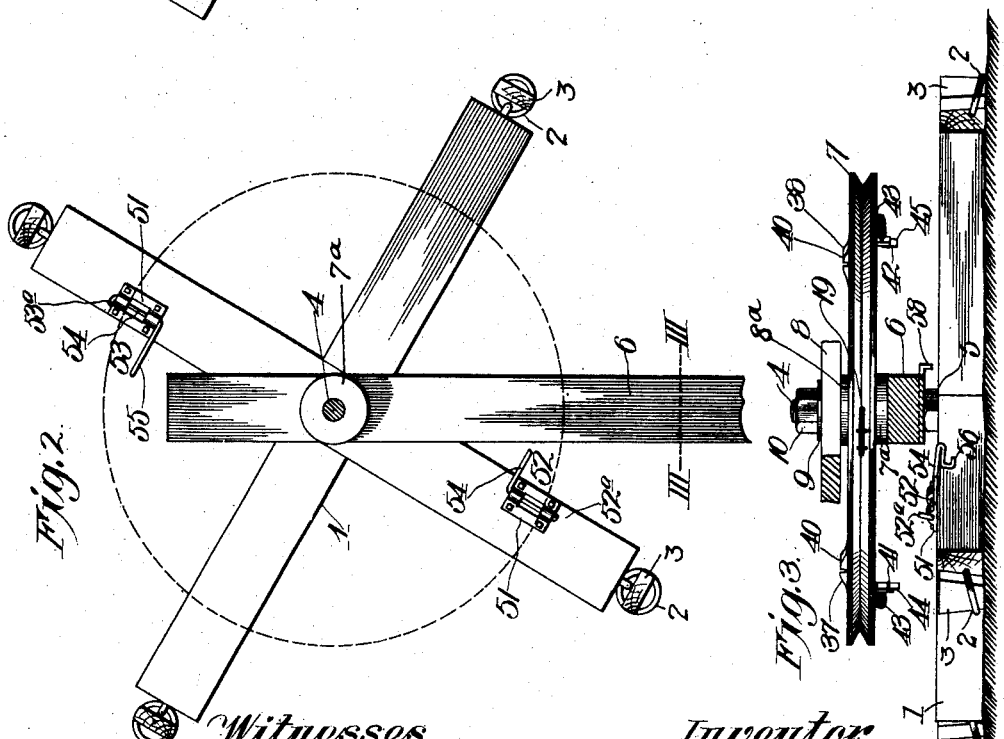
Witnesses
Inventor
E. A. Rhoades E. A. RHOADS.
HAY STACKER.
APPLICATION FILED JAN. 10, 1908.
905,368.
Patented Dec. 1, 1908.
3 SHEETS—SHEET 3.
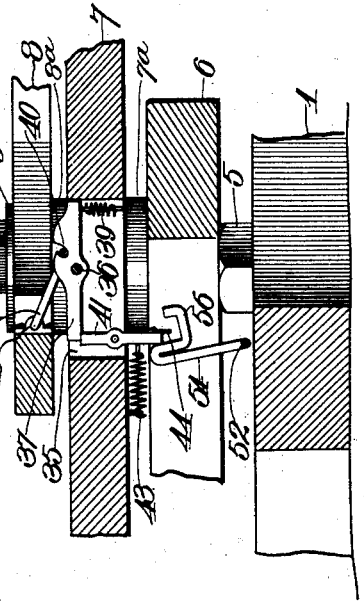
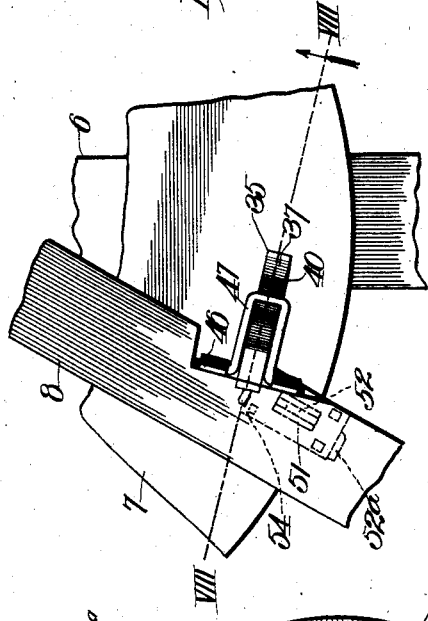
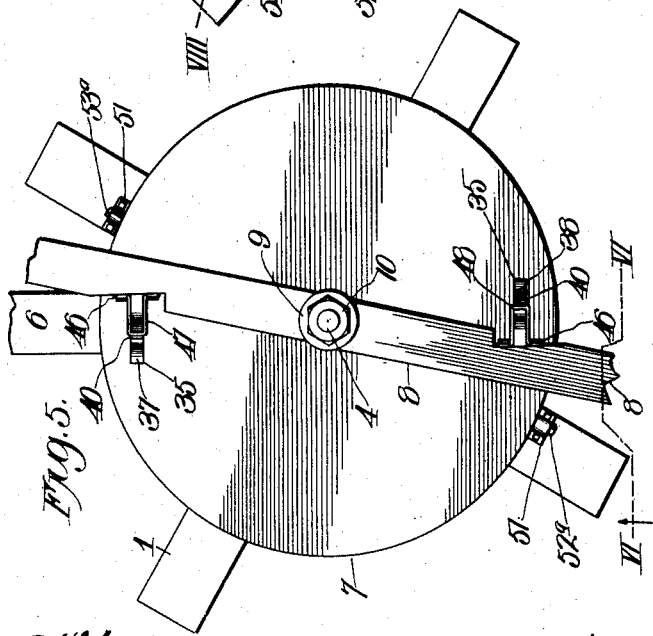
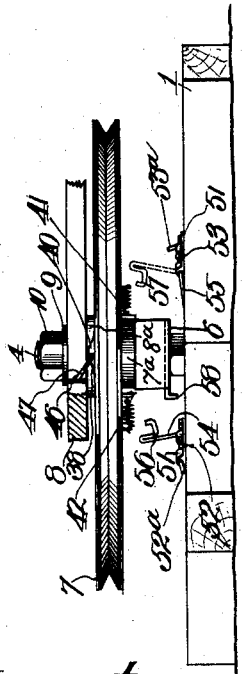
Witnesses
Frank R. Glore
H. C. Rodgers
Inventor
E. A. Rhoads
By George H. Thorpe
Atty.

UNITED STATES PATENT OFFICE.

EDWIN A. RHOADS, OF PRAIRIE VIEW, KANSAS.

HAY-STACKER.

No. 905,368.     Specification of Letters Patent.     Patented Dec. 1, 1908.

Application filed January 10, 1908. Serial No. 410,254.

*To all whom it may concern:*

Be it known that I, EDWIN A. RHOADS, a citizen of the United States, residing at Prairie View, in the county of Phillips and State of Kansas, have invented certain new and useful Improvements in Hay-Stackers, of which the following is a specification.

This invention relates to hay stackers and my object is to produce a machine of this character whereby hay stacks may be built in circular or segmental form and of varying length, width and height.

A further object is to produce a machine which is efficient and reliable in operation.

A still further object is to produce a machine of this character of simple, strong, durable and cheap construction.

With these general objects in view and others as hereinafter appear the invention consists in certain novel and peculiar features of construction and organization as hereinafter described and claimed; and in order that it may be fully understood reference is to be had to the accompanying drawings, in which—

Figure 1 is a perspective view of a hay stacker embodying my invention. Fig. 2, is a horizontal section taken just below the turntable. Fig. 3, is a vertical section taken on the line III—III of Fig. 2. Fig. 4, is a plan view of a part of the hay stacker with the parts in the positions they occupy after the load of hay is elevated the desired distance. Fig. 5, is plan view with the parts in the position they occupy after the tower has traveled about one hundred and eighty degrees. Fig. 6, is a section on the line VI—VI of Fig. 5. Fig. 7, is an enlarged plan view of a part of the power end of the machine after the tower has described a complete circle. Fig. 8 is a vertical section on the line VIII—VIII of Fig. 7.

In the said drawings 1 indicates a base preferably in the form of a cross and secured rigidly to the ground by means of rings 2 and stakes 3 or in any other suitable manner.

4 is a vertical pivot bolt secured to the base and projecting upward therefrom. 5 is a nut or spacing washer secured to said bolt and forming a bearing upon which the horizontal beam 6 of the tower hereinafter described turns, said beam pivotally engaging said bolt. 7 is a peripherally grooved drum or turntable journaled on said bolt and spaced from the underlying beam 6 by a collar $7^a$ on the bolt. 8 is a sweep pivoted on said bolt and spaced from the turn table by a collar $8^a$ secured to the bolt.

9 is a washer fitting on the bolt and upon the sweep and 10 is a nut engaging the upper end of the bolt and bearing upon said washer to hold the rotary elements 6, 7, and 8 in proper relation to each other.

The tower hereinbefore referred to is preferably constructed as follows: 11 indicates a cross bar secured to the outer end of beam 6 and braced by inclined braces 12 and equipped at its ends with small wheels 13 resting and adapted to travel in a circular direction around pivot bolt 4. 14 is an upright secured upon the outer end of beam 6 and braced as at 15 or otherwise. 16 is a bar secured to the top of the upright 14 and arranged substantially parallel with beam 6 and braced from the upright by braces 17 or otherwise. The upright and bar 16 are also braced by means of a tie rod 18 connecting the inner end of bar 16 with beam 6.

19 is a cable secured to the drum or turntable and extending outwardly therefrom in engagement with a guide sheave 20 carried by bracket 21 secured to the beam. It also extends through the lower bifurcated end of brace 18 and around a grooved sheave 22 carried by a bracket 23 secured to beam 6. From sheave 22 it extends upward through an opening 24 in bar 16 and over a sheave 25 mounted upon said bar. From said sheave it extends outwardly and engages a similar sheave 26 carried by and at the outer end of said bar and from said sheave extends downward through an opening 27 in the bar and is adapted to be equipped with a suitable hay elevating apparatus, such as a sling, not shown.

28 is a collar secured on cable 19 and adapted to travel with the cable around sheave 22 and inward over beam 6 until it engages the outer end of a slidable frame loosely threaded on the cable, said frame comprising a longitudinal portion 29 terminating at each end in a loop or eye 30 and provided contiguous to the outermost loop or eye 30 and at one side of the same with a second loop or eye 31 to which one end of a second cable 32 is attached, said cable engaging a grooved sheave 33 carried by a bracket 34 secured to beam 6, said bracket bridging said cables by preference as shown in Fig. 1. A horse is adapted to be hitched to cable 32, for a purpose which hereinafter appears.

The drum or turntable is provided at diametrically opposite points with openings 35 bridged by pivots 36, upon which are pivotally mounted catches 37 and 38, said catches having their rear ends with respect to the direction of rotation held yieldingly depressed by retractile springs 39. At their upper sides the catches are each provided with a notched lug 40 of segmental form in side view and at their opposite or front ends with respect to the direction of rotation, catches 37, 38, respectively rest upon triggers 41 and 42 pivoted within openings 35 and depending varying distances below the drum or turntable, retractile springs 43 connecting the triggers with the drum for the purpose of holding the former in engagement with the catches. Pivotally depending from the triggers 41 and 42 respectively are loops 44 and 45, the triggers preventing the loops from swinging forward beyond a certain distance but leaving them free to swing in the opposite direction.

Hinged as at 46 to opposite sides of the sweep 8 and projecting rearward therefrom with respect to its direction of rotation are draft loops 47 and 48 and depending pivotally from the sweep are loops 49 which in traveling in a forward direction will pass freely over the rearwardly disposed hook 50 carried by or formed with bracket 21, but will be caught by said hook should the movement of the sweep be reversed and continued a sufficient length of time.

51 indicates a pair of brackets secured to the base at diametrically opposite points. 52 and 53 are trigger-trippers arranged radially and journaled in brackets 51 and provided at their outer ends with crank arms 52$^a$ and 53$^a$ respectively and at their inner ends with crank arms 54 and 55 respectively, the arm 54 being shorter than arm 55 in order that the trigger 42 may pass over arm 54 when standing upright but engage arm 55 when it is standing upright, the trigger 41 depending a sufficient distance from the drum or turn table to engage arm 54 when upright, as explained.

56 and 57 are hooks depending from the outer ends of crank arms 54 and 55 respectively, these hooks being adapted for engagement by loops 44 and 45 as hereinafter explained.

58 indicates a lug depending from beam 6 for the purpose of raising arms 54 and 55 respectively to an upright position which they will maintain by reason of the engagement of the arms 52$^a$ and 53$^a$ with the base, until the pendent loops 44 and 45 in a manner hereinafter explained, effects the restoration of the trigger trippers to their original positions, as shown in Figs. 2 and 3.

In the practical operation of the machine the parts are arranged substantially as shown in Figs. 1, 2 and 3, a load of hay being secured in the sling or equivalent hay elevating device to be carried by the cable below the outer end of bar 16 of the tower. A horse is preferably hitched to each end of the sweep and is driven in a circular path with the draft-loops 47 and 48 trailing behind the sweep. Shortly after the movement of the sweep begins it becomes interlocked with the drum or turn table by the dropping of its draft loops 47, 48, into the notched lugs 40 of the catches 37, 38 respectively, and as a result the drum or turn table rotates in unison with the sweep so as to wind cable 19 upon the drum or turntable, which latter turns until the collar 28 comes into engagement with the outermost eye or loop of the slide frame arranged on the cable and starts to push the same inward, it being understood that the collar 28 is located a distance outward of said frame corresponding to the height it is desired to raise the load of hay. As the collar 28 moves said slide frame inward, the latter pulls back on cable 32 until whatever slack is in said cable has been taken up and a backward pull is imposed on the horse hitched to said cable 32, which horse either by training or naturally will resist this pull and as a result the tower with bolt 4 as the axis, will start to travel in the same direction as the horses hitched to the sweep, it being understood that the pull of the last-named horses in conjunction with the resistance of the horse hitched to the cable is sufficient to rotate the tower, though in fact the horse last referred to immediately starts or is driven forward as the cable 32 tends to slacken in the starting movement of the tower and thus coöperates with the horses hitched to the sweep in causing the tower to travel in a circle.

The stack man viz. the man who will stand upon the stack as it is built to effect the desired distribution of the hay, will trip the sling or other hay holding and lifting device at the point desired and by reason of its flexible support may swing it laterally of the stack that is toward and from the upright 14 so as to vary the width of the stack. He effects a variation in the length of the stack by tripping the sling at more or less remote points from the starting point of the tower on its circular travel. The height of the stack may be varied by shifting the position of the collar 28 on the cable, so as to cause said collar to travel a greater or less distance before it comes into engagement with the said slide frame to cause the same to exert a back pull on the cable 32, it being understood that until said collar comes into engagement with the frame the load is being elevated.

As the tower-carrying beam swings over the trigger-tripper 52, the depending lug 58 strikes the upwardly projecting crank 52ª of said trigger-tripper and raises it from the position shown in Fig. 3, to the position shown in Figs. 6 and 8. After said beam has traveled about one hundred and eighty degrees from trigger-tripper 52, its lug 58 comes into engagement with the upwardly projecting crank 53ª of trigger-tripper 53 and throws the same to the position shown in dotted lines Fig. 6, it being understood in this connection that the depending trigger 41 passes the trigger-tripper 53 in advance of the depending lug of beam 6 and consequently is not affected by said trigger-tripper when elevated, it being further noticed that said trigger-tripper is longer and therefore projects to a higher plane than the trigger-tripper 52, and that the trigger 42 which is sufficiently short to pass over the elevated trigger-tripper 52 passes over the latter at the same moment that the trigger 41 passes over the depressed trigger-tripper 53. In this connection it should be understood that trigger 41 which depends lower from the drum or turntable than the trigger 42 is adapted to be tripped by the elevated trigger-tripper 52 at the proper time and that the short trigger 42 is adapted to be tripped by the long trigger-tripper 53 as hereinafter appears.

The continued operation of the sweep, drum and beam continues until the latter has completed a revolution and attained its original position as shown in Figs. 1 to 4 inclusive most clearly and at the instant said beam attains such original position the trigger 41 and trigger 42 respectively pass over the hooks of trigger-trippers 53 and 52 and engage the upper ends of the arms from which said hooks depend and are tripped by said arms because the arms 52ª and 53ª are held from further movement by the base. As a result said triggers are withdrawn from engagement with the catches and the pull thereon of the sweep causes their rear ends to swing upward against the resistance of spring 39 until the draft loops pull out of the notches of lugs 40. Immediately this occurs the catches spring back to their original positions and the triggers spring under them as indicated clearly in Fig. 8. As the tower is thus restored to its original position, the stack man if it is necessary, pulls down on the outer end of cable 18 and to lower the sling or its equivalent and unwind the drum or turn table. As the drum or turntable starts on its reverse movement the gravity loops 44 and 45 engage the hooks 56 and 57 and rock them back to their original positions as shown in Figs. 2 and 3. This backward movement of the drum or turn table is comparatively fast and as a consequence the catches 37 and 38 successively pass under the loops 47 and 48 without giving the latter an opportunity to drop into their notches, the drum or turn table being arrested as it attains its initial position as shown in Fig. 1 when the operations previously described can be repeated.

In the event that it is desired to hold the load of hay elevated the person in charge will back the horses attached to the sweep sufficiently to cause one of the loops 49 to engage hook 50, the load of hay effecting the backward movement of the drum and sweep to effect such purpose. By thus interlocking the sweep and drum with beam 6, the weight of the load is removed from the horses.

From the above description it will be apparent that I have produced a hay stacker embodying the features of advantage enumerated and I wish it to be understood that I do not desire to be restricted to the exact details of construction shown and described as obvious modifications will occur to one skilled in the art.

Having thus described the invention what I claim as new and desire to secure by Letters Patent, is:—

1. In a hay stacker, a stationary base, a beam journaled for substantially horizontal rotation on said base and equipped with a tower at its outer end, a horizontally rotatable drum having its axis coincidental with that of the beam, a suitably guided cable attached at one end to the drum and having its opposite end depending from the outer end of the tower, a horizontally rotatable sweep having its axis coincidental with that of the drum and beam, means for interlocking the sweep with the drum to rotate the latter through the rotation of the sweep and wind the cable on the drum, and means for causing the movement of the sweep and drum to impart rotatable movement in the same direction to the tower-equipped beam by arresting the winding movement of the cable on the drum.

2. In a hay stacker, a stationary base, a beam journaled for substantially horizontal rotation on said base and equipped with a tower at its outer end, a horizontally rotatable drum having its axis coincidental with that of the beam, a suitably guided cable attached at one end to the drum and having its opposite end depending from the outer end of the tower, a horizontally rotatable sweep having its axis coincidental with that of the drum and beam, means for interlocking the sweep with the drum to rotate the latter through the rotation of the sweep and wind the cable on the drum, means for causing the movement of the sweep and drum to impart rotatable movement in the same direction to the tower-equipped beam by arresting the winding movement of the cable on the drum, and means actuated by the complete revolution of the tower equipped beam to unlock the drum from the sweep to permit the rotation of the drum to be reversed and the cable to be unwound therefrom.

3. In a hay stacker, a stationary base, a beam projecting rotatably from the base and equipped with a tower at its outer end, a rotatable drum above the beam with its axis coincidental with that of the latter, a suitably-guided cable attached at one end to the drum and its opposite end depending from the tower, a rotatable sweep above and having its axis coincidental with that of the drum, pivoted catches carried by the drum, retractile springs connecting the catches with the drum and tending to hold the former depressed at their rear ends, pivoted draft-loops carried by the sweep and adapted to engage said catches to rotate the drum with the sweep and tending to effect rocking movement of the catches against the resistance of said springs, pivoted triggers carried by the drum, retractile springs connecting said triggers with the drum to cause the former to hold the catches against pivotal movement by the draft-loops, pivoted trigger-trippers mounted upon the base, means caused by the movement of the sweep and drum to impart rotatable movement in the same direction to the tower-equipped beam by arresting the winding movement of the cable on the drum, and means movable with the beam, for successively disposing the trigger-trippers in the path of the triggers to trip the same from the path of the catches.

4. In a hay stacker, a stationary base, a beam projecting rotatably therefrom, and equipped with a tower at its outer end, a rotatable drum above the beam with its axis coincidental with that of the latter, a suitably-guided cable attached at one end to the drum and its opposite end depending from the tower, a rotatable sweep above and having its axis coincidental with that of the drum, pivoted catches carried by the drum, retractile springs connecting the catches with the drum and tending to hold the former depressed at their rear ends, pivoted draft-loops carried by the sweep and adapted to engage said catches to rotate the drum with the sweep and tending to effect rocking movement of the catches against the resistance of said springs, pivoted triggers carried by the drum, retractile springs connecting said triggers with the drum to cause the former to hold the catches against pivotal movement by the draft-loops, pivoted trigger-trippers mounted upon the base, means caused by the movement of the sweep and drum to impart rotatable movement in the same direction to the tower-equipped beam by arresting the winding movement of the cable on the drum, means movable with the beam for successively disposing the trigger-trippers in the path of the triggers to trip the same from the path of the catches to permit the draft-loops to operate and withdraw from engagement of said catches against the resistance of the springs connected to the latter, and thus permit the drum to be rotated backwards and effect the unwinding of the cable therefrom, and means whereby the backward rotation of the drum shall swing the trigger-trippers back to their original positions.

5. In a hay stacker, a stationary base, a beam projecting rotatably therefrom, and equipped with a tower at its outer end, a rotatable drum above the beam with its axis coincidental with that of the latter, a suitably-guided cable attached at one end to the drum and its opposite end depending from the tower, a rotatable sweep above and having its axis coincidental with that of the drum, pivoted catches carried by the drum, retractile springs connecting the catches with the drum and tending to hold the former depressed at their rear ends, pivoted draft-loops carried by the sweep and adapted to engage said catches to rotate the drum with the sweep and tending to effect rocking movement of the catches against the resistance of said springs, pivoted triggers carried by the drum, retractile springs connecting said triggers with the drum to cause the former to hold the catches against pivotal movement by the draft-loops, pivoted trigger-trippers mounted upon the base, and provided with hooks at their rear sides, means caused by the movement of the sweep and drum to impart rotatable movement in the same direction to the tower-equipped beam by arresting the winding movement of the cable on the drum, means movable with the beam for successively disposing the trigger-trippers in the path of the triggers to trip the same from the path of the catches to permit the draft-loops to operate and withdraw from engagement of said catches against the resistance of the springs connected to the latter, and thus permit the drum to be rotated backwards and effect the unwinding of the cable therefrom, and pivoted loops carried by the triggers, to engage the hooks of the trigger-trippers and swing the latter back to their original positions as the backward movement of the drum occurs.

6. In a hay stacker, a stationary base, a beam rotatable on and extending from the base and equipped with a tower at its outer end, a rotatable drum above the base, a suitably-guided cable attached at one end to the drum and its opposite end depending from the outer end of the tower, a rotatable sweep having its axis coincidental with that of the drum, means interlocking the sweep with the drum to rotate the latter through the rotation of the sweep and wind the cable upon the drum, a movable draft-cable extending laterally from the tower-equipped beam, and means movable with the drum cable as the latter is wound upon the drum for causing a backward pull on the draft-cable and thereby effecting rotatable movement of the tower-equipped beam in the same direction as the drum.

7. In a hay stacker, a stationary base, a beam rotatable on and extending from the base and equipped with a tower at its outer end, a rotatable drum above the base, a suitably-guided cable attached at one end to the drum and at its opposite end depending from the outer end of the tower, a horizontally rotatable sweep having its axis coincidental with that of the drum, means interlocking the sweep with the drum to rotate the latter through the rotation of the sweep and wind the cable upon the drum, a frame longitudinally slidable on the said cable, a suitably guided draft-cable engaging said frame at one end and extending laterally from the beam in the direction in which the drum is turned by the sweep, and means rigid with the drum cable to move inward as the latter is wound upon the drum and engage said slide frame and tend to push the same toward the drum against the resistance of the draft cable.

In testimony whereof I affix my signature, in the presence of two witnesses.

EDWIN A. RHOADS.

Witnesses:
C. W. RHOADS,
E. A. RHOADS.